(12) United States Patent
Li

(10) Patent No.: US 9,390,557 B2
(45) Date of Patent: Jul. 12, 2016

(54) FLOATING VOLUME-OF-INTEREST IN MULTILAYER VOLUME RAY CASTING

(75) Inventor: Wei Li, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 13/483,262

(22) Filed: May 30, 2012

(65) Prior Publication Data

US 2013/0063436 A1 Mar. 14, 2013

Related U.S. Application Data

(60) Provisional application No. 61/522,301, filed on Aug. 11, 2011.

(51) Int. Cl.
*G06T 15/00* (2011.01)
*G06T 15/08* (2011.01)
*G06T 17/20* (2006.01)

(52) U.S. Cl.
CPC ............. *G06T 17/205* (2013.01); *G06T 15/08* (2013.01); *G06T 15/00* (2013.01)

(58) Field of Classification Search
USPC ......................................................... 345/423
See application file for complete search history.

(56) References Cited

U.S. PATENT DOCUMENTS

| 6,014,143 | A * | 1/2000 | Naqvi et al. ................... 345/424 |
| 2001/0052906 | A1 * | 12/2001 | Chen ............................. 345/629 |
| 2004/0056871 | A1 * | 3/2004 | Milliron ......................... 345/647 |
| 2008/0246768 | A1 * | 10/2008 | Murray et al. ................. 345/427 |
| 2009/0174729 | A1 * | 7/2009 | Matsumoto .................... 345/619 |

FOREIGN PATENT DOCUMENTS

| CN | 101188024 A | 5/2008 |
| CN | 101625766 A | 1/2010 |
| CN | 102024270 A | 4/2011 |
| CN | 102024271 A | 4/2011 |
| CN | 102074039 A | 5/2011 |

OTHER PUBLICATIONS

Wei Li, Multi-layer Volume Ray Casting on GPU, May 2nd, 2010, 8th IEEE/EG International Symposium on Volume Graphics, Volume Graphics 2010.*

Weiskipf et al. (Daniel Weiskopf, "Volume Clipping via Per-Fragment Operations in Texture-Based Volume Visualization", 2002, Proceeding VIS '02 Proceedings of the conference on Visualization '02 pp. 93-100).*

(Continued)

*Primary Examiner* — Ming Hon
*Assistant Examiner* — Yu-Jang Tswei

(57) ABSTRACT

A method that includes receiving vertices of a mesh, wherein the mesh represents a volume of interest (VOI) from an original volume, performing a transformation operation on the mesh, wherein the transformation operation transforms vertices of the mesh, obtaining sampling locations of the original volume using the transformed vertices, performing an inverse transformation on the transformed vertices of the mesh and the sampling locations, and performing a ray casting on the original volume to produce an image, wherein the ray casting uses the transformed vertices and a result of the inverse transformation as input.

12 Claims, 7 Drawing Sheets

(56) References Cited

OTHER PUBLICATIONS

Esperança, Hanan Samet, Vertex Representations and their Applications in Computer Graphics, National Science Foundation, 1998.*

Myocard, "Manual VOI Definition and Editing of Automatic VOIs", 2006, Myocard.*

First Office Action issued by the Chinese Patent Office on Dec. 31, 2015.

* cited by examiner (a)          (b)          (c)

FLOATING VOLUME-OF-INTEREST IN MULTILAYER VOLUME RAY CASTING

CROSS-REFERENCE TO RELATED APPLICATION

This application claims priority under 35 U.S.C. §119 to U.S. provisional application No. 61/522,301 filed Aug. 11, 2011, the disclosure of which is incorporated by reference herein in its entirety.

BACKGROUND OF THE INVENTION

1. Technical Field

The present invention relates to multilayer volume ray casting.

2. Discussion of the Related Art

Multilayer volume ray casting is an advanced technique built on top of standard volumetric ray casting that supports various efficient enhancements to standard volume visualization, such as cut-planes, crop-box, empty-space-skipping, punching masks, volume-of-interest masks, embedded multiplanar reconstructions (MPRs), and embedded curve and ribbon MPRs. The basic idea is to treat all the above descriptions as one or more volume-of-interest (VOI) definitions and use hardware accelerated surface rendering to convert the boundary models of these VOIs into a ray-layer buffer. The VOIs can have different priorities and multiple VOIs may overlap in three-dimensional (3D) space. The creation of the ray-layer buffer resolves the overlap according to the priorities. Each pixel of the ray-layer buffer then contains the information of a set of ray segments, including the starting locations and the material IDs. The multi-layer ray caster then renders each ray segment with the proper visualization parameters depending on the material ID.

A description of a VOI typically involves two parts: 1) a mask defining which voxels belong to the VOI, and 2) a set of viewing parameters that usually distinguishes the regions inside the VOI away from the region outside it. FIG. 1 shows a visualization example of a VOI inside a head dataset. The voxels enclosed in the VOI are rendered using a different color lookup table.

A mask can be specified as a binary volume since each voxel of the binary volume determines whether the voxel belongs to the VOI, or a closed polygonal mesh that defines the boundary between voxels inside the mask and voxels outside the mask. A mask in the form of a polygonal mesh may hereinafter be referred to as a geometric mask. Multilayer volume ray casting is particularly efficient in visualizing geometric masks.

SUMMARY OF THE INVENTION

In an exemplary embodiment of the present invention, there is provided a method comprising: receiving vertices of a mesh, wherein the mesh represents a volume of interest (VOI) from an original volume; performing a transformation operation on the mesh, wherein the transformation operation transforms vertices of the mesh; obtaining sampling locations of the original volume using the transformed vertices; performing an inverse transformation on the transformed vertices of the mesh and the sampling locations; and performing a ray casting on the original volume to produce an image, wherein the ray casting uses the transformed vertices and a result of the inverse transformation as input.

The transformation operation includes a translation, rotation, scaling, shearing, or mirroring.

The method further comprising assigning a higher priority number to the VOI compared to other VOIs from the original volume.

A crop-box or cut-plane in the original volume does not clip away the VOI with the higher priority.

The method further comprising: duplicating the vertices of the mesh to represent first and second VOIs of identical shapes; rendering the first VOI with a color lookup table full of zeros so that the first VOI represents an empty region; rendering the second VOI with the same color lookup table as a region outside the second VOI; transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

The method further comprising: duplicating the vertices of the mesh to represent first and second VOIs of identical shapes; rendering the first VOI with a color lookup table different from voxels outside the first VOI; rendering the second VOI with the same color lookup table as the first VOI; transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

In an exemplary embodiment of the present invention, there is provided a system comprising: a memory device for storing a program; a processor in communication with the memory device, the processor operative with the program to: receive vertices of a mesh, wherein the mesh represents a VOI from an original volume; perform a transformation operation on the mesh, wherein the transformation operation transforms vertices of the mesh; obtain sampling locations of the original volume using the transformed vertices; perform an inverse transformation on the transformed vertices of the mesh and the sampling locations; and perform a ray casting on the original volume to produce an image, wherein the ray casting uses the transformed vertices and a result of the inverse transformation as input.

The transformation operation includes a translation, rotation, scaling, shearing, or mirroring.

The processor is further operative with the program to assign a higher priority number to the VOI compared to other VOIs from the original volume.

A crop-box or cut-plane in the original volume does not clip away the VOI with the higher priority.

The processor is further operative with the program to: duplicate the vertices of the mesh to represent first and second VOIs of identical shapes; render the first VOI with a color lookup table full of zeros so that the first VOI represents an empty region; render the second VOI with the same color lookup table as a region outside the second VOI; transform the mesh of the second VOI so that it moves away from an original position and orientation; and calculate sampling locations, which are used for rendering the second VOI, from the transformed mesh of the second VOI followed by an inverse transformation, so that these sampling locations are the same as those computed from an untransformed version of the mesh of the second VOI.

The processor is further operative with the program to: duplicate the vertices of the mesh to represent first and second VOIs of identical shapes; render the first VOI with a color lookup table different from voxels outside the first VOI; render the second VOI with the same color lookup table as the first VOI; transform the mesh of the second VOI so that it moves away from an original position and orientation; and calculate sampling locations, which are used for rendering the second VOI, from the transformed mesh of the second VOI followed by an inverse transformation, so that these sampling locations are the same as those computed from an untransformed version of the mesh of the second VOI.

In an exemplary embodiment of the present invention, there is provided a computer program product comprising: a non-transitory computer readable storage medium having computer readable program code embodied therewith, the computer readable program code comprising: computer readable program code configured to perform the steps of: receiving vertices of a mesh, wherein the mesh represents a VOI from an original volume; performing a transformation operation on the mesh, wherein the transformation operation transforms vertices of the mesh; obtaining sampling locations of the original volume using the transformed vertices; performing an inverse transformation on the transformed vertices of the mesh and the sampling locations; and performing a ray casting on the original volume to produce an image, wherein the ray casting uses the transformed vertices and a result of the inverse transformation as input.

The transformation operation includes a translation, rotation, scaling, shearing, or mirroring.

The computer readable program code is further configured to perform the step of assigning a higher priority number to the VOI compared to other VOIs from the original volume.

A crop-box or cut-plane in the original volume does not clip away the VOI with the higher priority.

The computer readable program code is further configured to perform the steps of: duplicating the vertices of the mesh to represent first and second VOIs of identical shapes; rendering the first VOI with a color lookup table full of zeros so that the first VOI represents an empty region; rendering the second VOI with the same color lookup table as a region outside the second VOI; transforming the mesh of the second VOI so that it moves away from an original position and orientation; and calculating sampling locations, which are used for rendering the second VOI from the transformed mesh of the second VOI followed by an inverse transformation, so that these sampling locations are the same as those computed from an untransformed version of the mesh of the second VOI.

The computer readable program code is further configured to perform the steps of: duplicating the vertices of the mesh to represent first and second VOIs of identical shapes; rendering the first VOI with a color lookup table different from voxels outside the first VOI; rendering the second VOI with the same color lookup table as the first VOI; transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

DETAILED DESCRIPTION OF EXEMPLARY EMBODIMENTS

Figure 1:
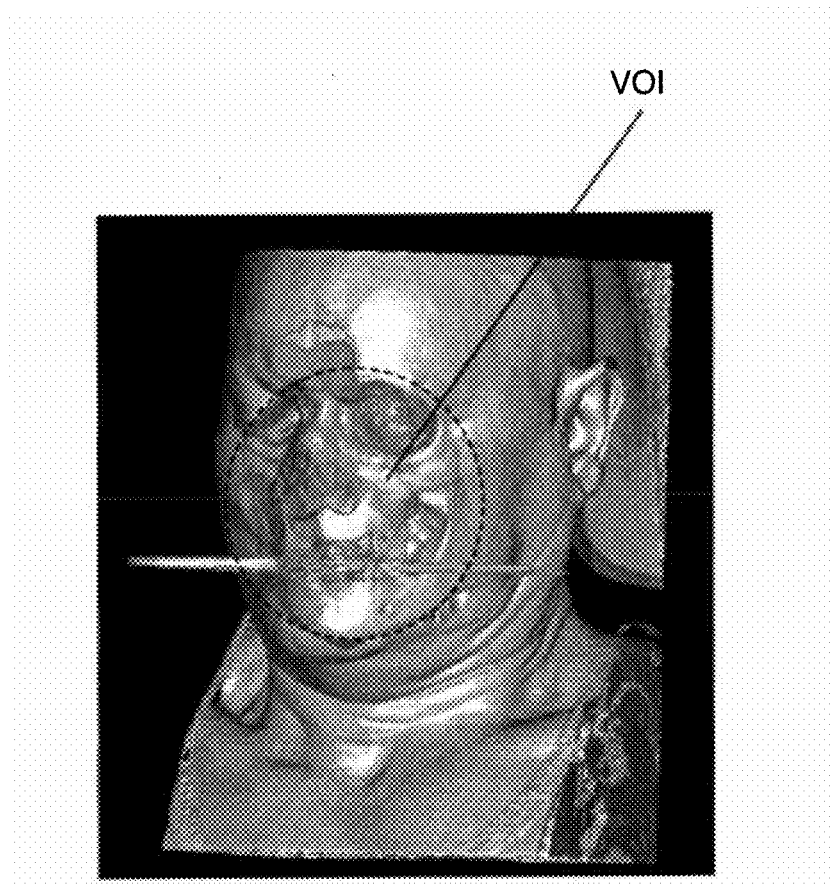
FIG. 1 shows a volume-of-interest (VOI) as an example.
Figure 2:
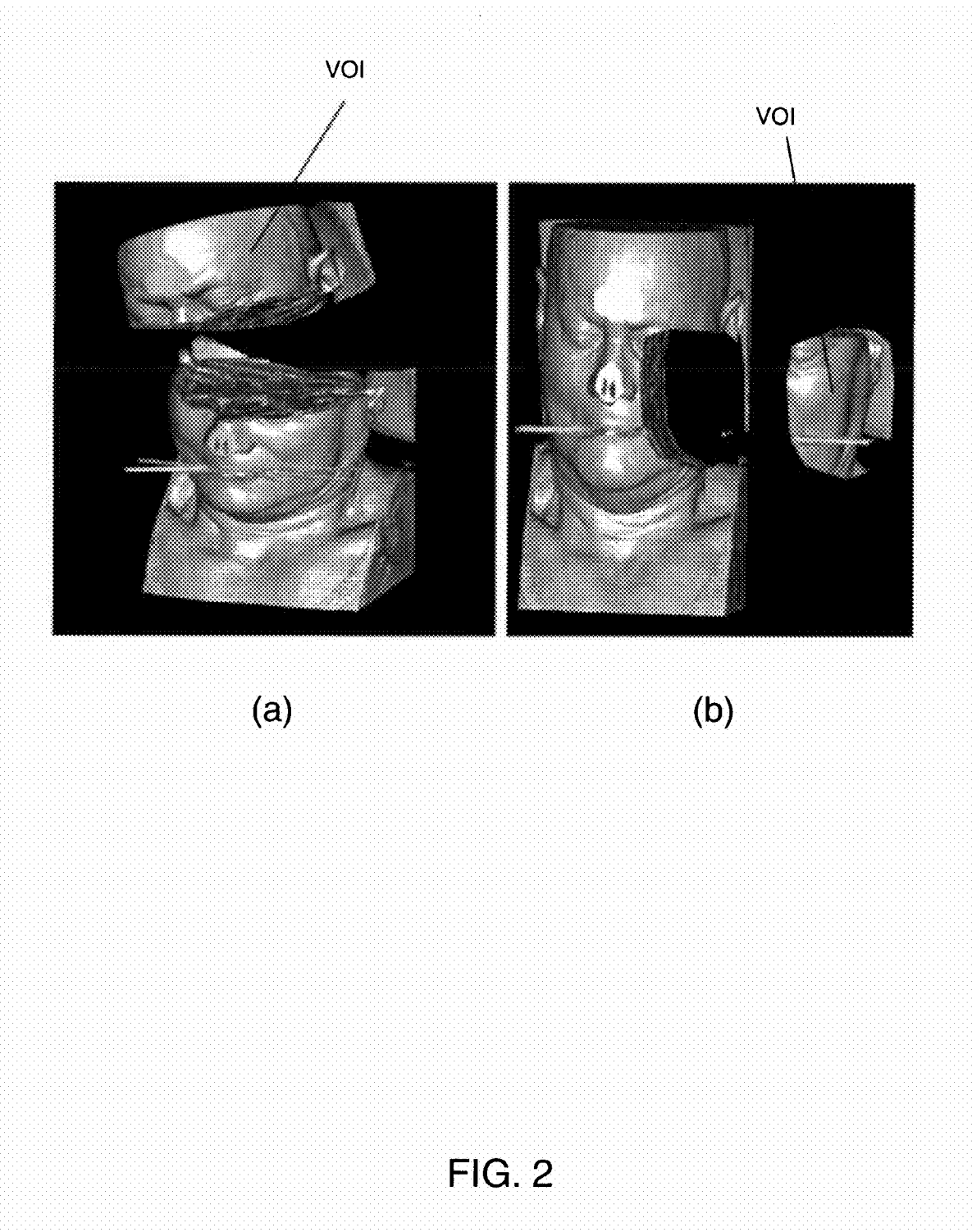
FIG. 2 shows a cut-out VOI according to an exemplary embodiment of the present invention.

In accordance with an exemplary embodiment of the present invention, there is provided an extension to multilayer volume ray casting so that it supports a feature hereinafter referred to as floating volume-of-interest (VOI). In contrast to standard VOI that stays at a fixed location once the VOI is defined, floating VOI can be moved freely in three-dimensional (3D) space. FIG. 2 shows two examples of the so-called cut-out VOI (a version of floating VOI), according to an exemplary embodiment of the present invention. In the left image (a) of FIG. 2, the VOI encloses the top of the head, and in the right image (b) of FIG. 2, the VOI encapsulates the right chin. Both VOIs are moved away from its original location.

Figure 3:
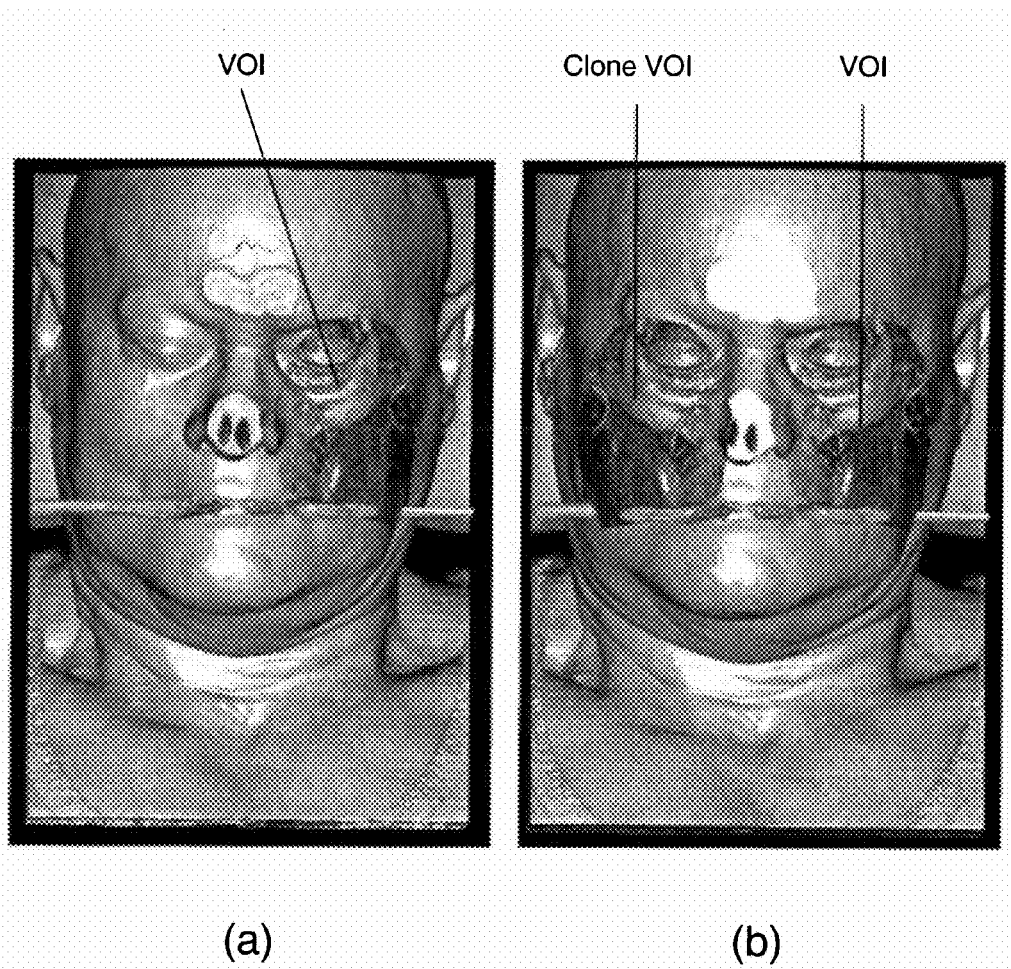
FIG. 3 shows a clone VOI according to an exemplary embodiment of the present invention.

FIG. 3 shows another use case of floating VOI, according to an exemplary embodiment of the present invention. In the left image (a) of FIG. 3, a regular VOI displays the right chin using a transfer function showing bones and vessels. In the right image (b) of FIG. 3, the VOI is cloned in a mirrored fashion relative to a vertical plane.

In previous work of multilayer volume ray casting, each geometric mask is defined by one or more polygonal meshes. These meshes are depth-peeled in a preprocessing step before the rendering of each from an image; with the depth of each fragment generated through rasterization encoded in a ray-layer buffer. During ray casting, the depth plus the screen coordinates of a fragment is used to reconstruct the 3D location of the starting (or ending) points of a ray segment. The starting points of the ray segments are also mapped to volume coordinates to obtain the sampling locations of the segments. For graphics processing unit (GPU)-based volume rendering, the sampling locations are essentially texture coordinates. Ray casting is then performed for each ray segment defined by these starting and ending point pairs.

In this scheme, every point in 3D space defined as a vertex stays at a fixed location and maps to a unique sampling location in volume space. The dataflow is show in FIG. 4.

Figure 4:
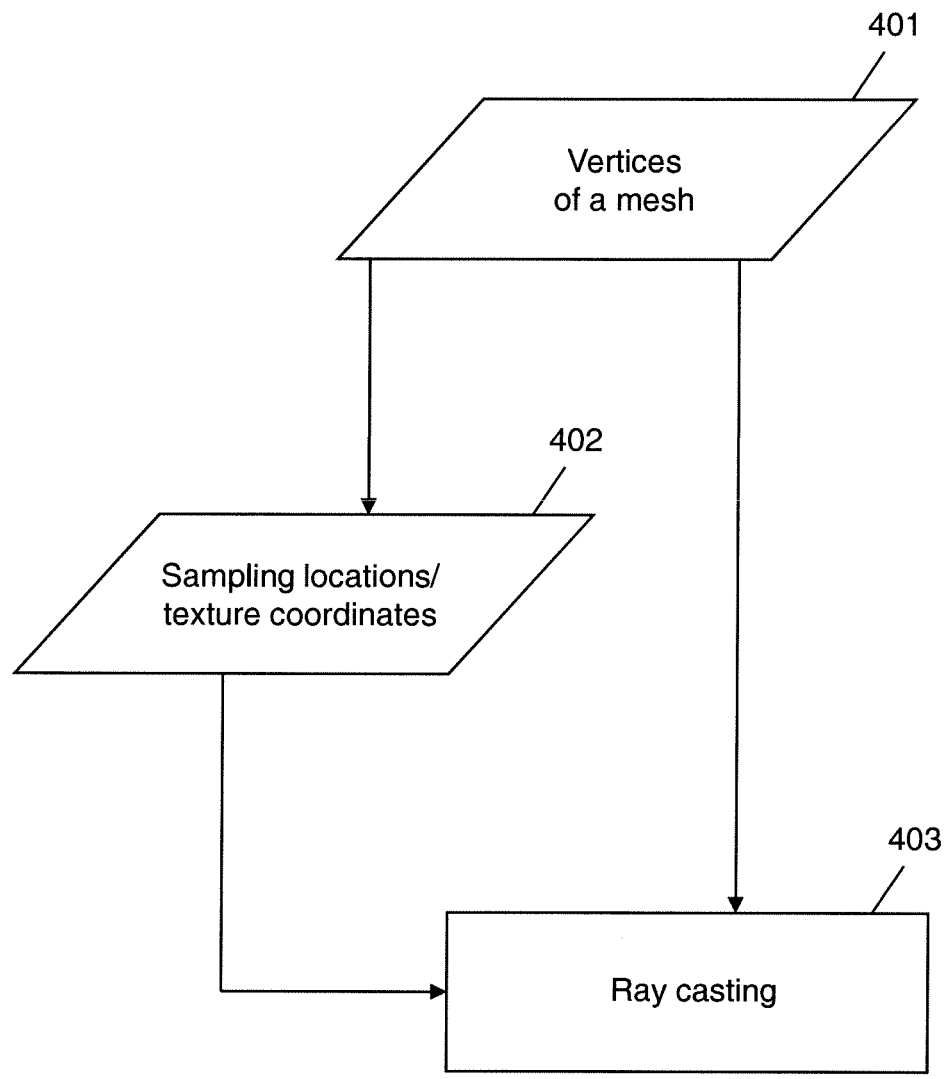
FIG. 4 shows a dataflow of rendering a static VOI.

For example, as shown in FIG. 4, the ray casting 403 accepts two sets of triple-element data. One is the set of vertices that define the starting locations of the rays, e.g., 401. The other is the set of sampling locations or texture coordinates, e.g., 402, that each associates uniquely with a vertex. A sampling location or texture coordinate specifies for the corresponding vertex where the volume dataset is sampled and the sample value is used to determine a color of the vertex.

Figure 5:
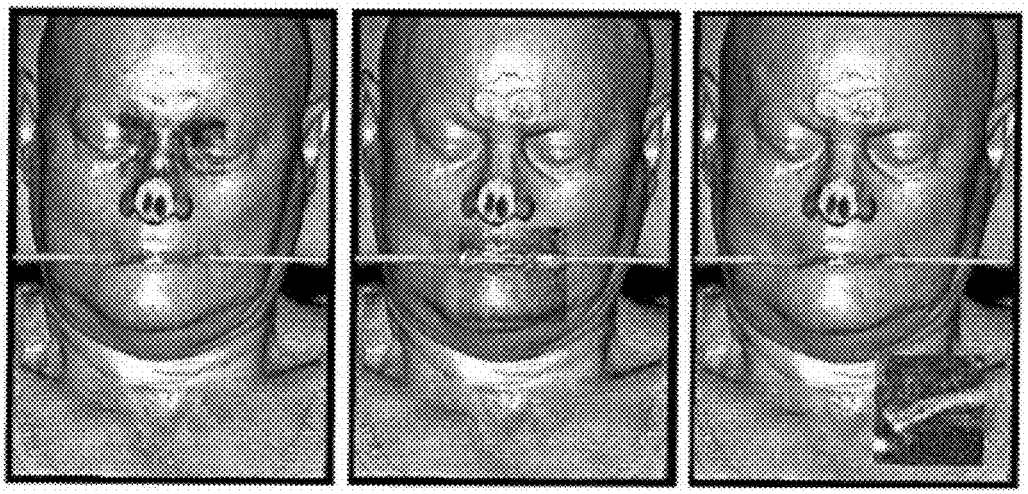
FIG. 5 shows moving a static VOI

It is possible to apply a transformation to the geometric mesh of a VOI so that the mesh is moved in 3D space. But for static VOI, it is the same as recreating the mesh. Moving a VOI in such a way is just like moving a window on a dataset, as shown by the sequence of images (a-c) in FIG. 5. Obviously, although a mask can be moved anywhere in 3D space, visible voxels cannot be outside the volume. In other words, ray casting is confined to the bounding box of the dataset.

In contrast to a static VOI, for a floating VOI, various transformations, such as translation, rotation, scaling, shearing and mirroring/flipping, can be applied to the vertices of the mesh, whereas the sampling locations assigned to the vertices stay with the initial values. Because the sampling locations are computed form the transformed vertices on-thefly, an inverse transformation is applied to the sampling locations before ray casting. The dataflow of floating VOI is shown in FIG. 6.

Figure 6:
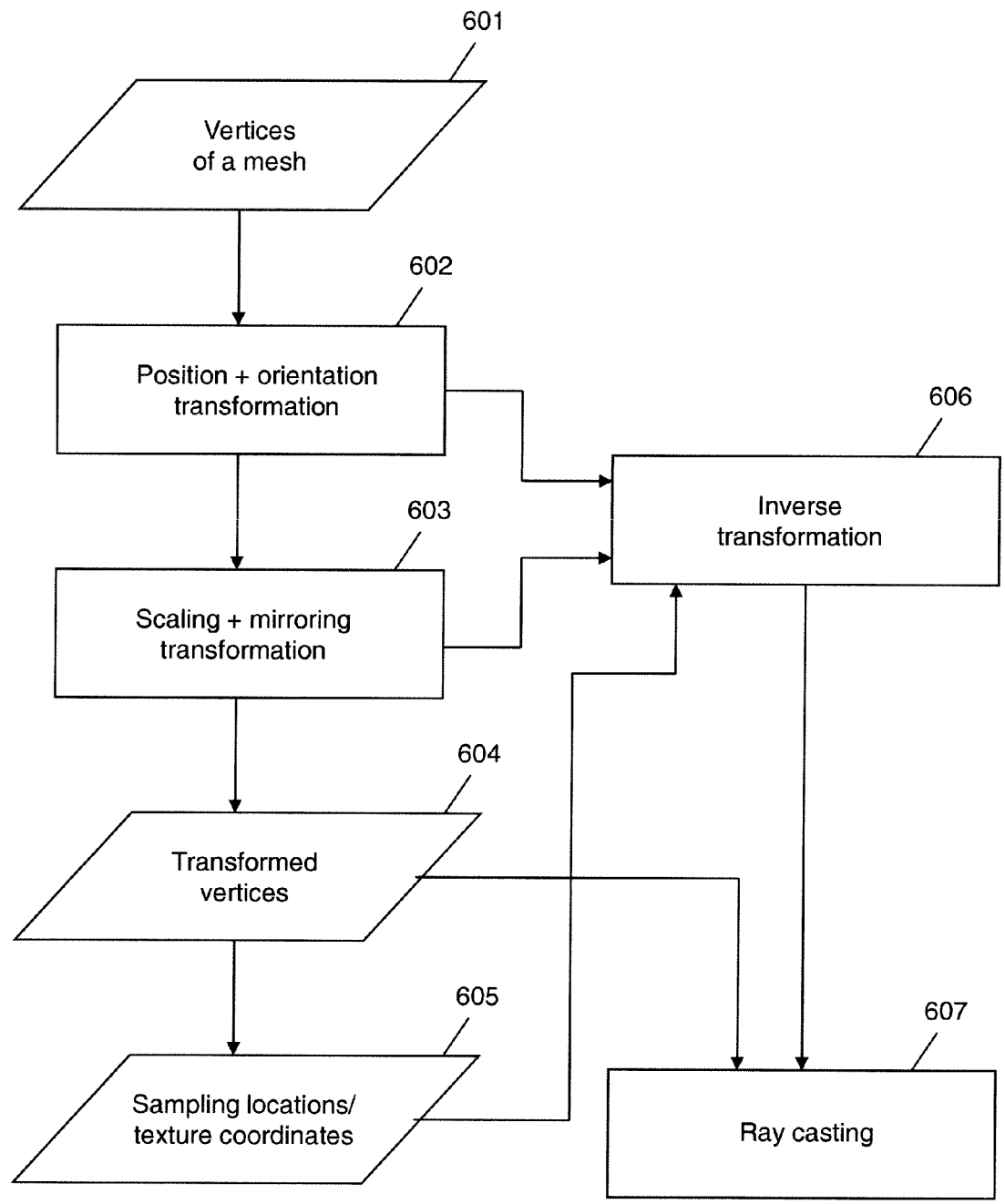
FIG. 6 shows a dataflow of moving a VOI according to an exemplary embodiment of the present invention.

For example, as shown in FIG. 6, the input vertices 601 may go through arbitrary transformations, such as translation, rotation, scaling and mirroring 602/603, and result in a set of transformed vertices 604 that are used to define the transformed starting positions of the ray segments corresponding to regions inside the VOI. The transformed vertices 604 are used to derive a set of sampling locations or texture coordinates 605 that are inversely transformed 606 before they are used for ray casting 607.

The method of FIG. 6 is similar to using the untransformed vertices to derive the sampling locations instead of the transformed ones. However, the method of FIG. 6, then requires storing both the original vertices and the transformed vertices. By using the transformed vertices to derive the sampling locations, the copy of the original vertices can be discarded.

Because the transformed vertices of a floating VOI can be anywhere in 3D space, the bounding box used in ray-layer buffer generation considers the transformed vertices. In addition, a floating VOI is assigned a priority number higher than other types of VOIs, including crop-box and cut-planes. In other words, a crop-box or a cut-plane does not clip away a floating VOI.

With the fundamental support of floating VOI, the cut-out VOI shown in images (a) and (b) in FIG. 2 and the clone VOI shown in image (b) in FIG. 3 are possible with the following steps. Basically, a cut-out VOI or a clone VOI is rendered twice in each depth-peeling pass for creating the ray-layer buffer, the first time as a regular static VOI, whereas the second time as a floating VOI. Once the ray-layer buffer is created, the ray casting is the same as the previous multilayer approach.

For cut-out VOI in one pass of depth peeling, the following steps are taken:
1. The cut-out VOI is treated as static VOI using an empty color lookup table, which is the same as a punch mask.
2. The cut-out VOI is treated as floating VOI with the transformation applied to all the vertices of the mesh. The floating VOI is assigned the same transfer function as the other part excluded by the cut-out VOI. The transformation is composed of these options: translation, rotation, scaling, shearing, and mirroring. The combination of all these transformations is represented by a 4-by-4 matrix.

During ray casting, the inverse transformation matrix in step 2 is applied to all the sampling locations derived from the floating VOI.

A clone VOI is implemented in a similar way. The difference from a cut-out VOI is that in both steps 1 and 2, the static VOI and the floating VOI are assigned the same transfer function, which is usually distinguishable from the other part of the volume. In FIG. 3. it is the transfer function that visualizes vessels and bones.

Because a floating VOI has a higher priority than VOIs of the other types, in any region that a floating VOI overlaps with a non-floating VOI, the floating VOI wins. In other words, a floating VOI overwrites any non-floating VOI. For example, in the left age (a) of FIG. 2, the floating VOI partially overlaps with the static punch VOI that is inserted internally in step 1, and all these overlapping regions are treated as the floating VOI. In the right image (b) of FIG. 3, the mirrored floating VOI overwrites the region in the left chin.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
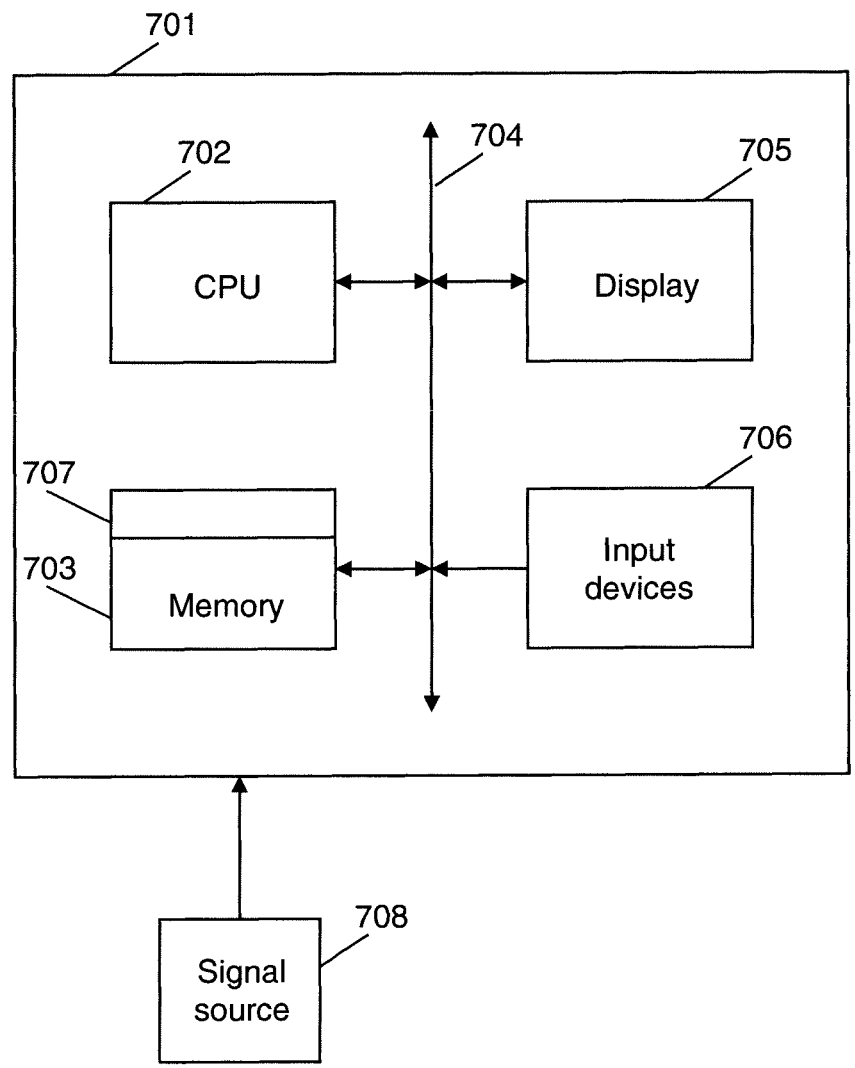
FIG. 7 shows a computer system in which an exemplary embodiment of the present invention may be implemented.

Referring now to FIG. 7, according to an exemplary embodiment of the present invention, a computer system 701 can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include RAM, ROM, disk drive, tape drive, etc., or a combination thereof. Exemplary embodiments of present invention may be implemented as a routine 707 stored in the memory 703 (e.g., a non-transitory computer-readable storage medium) and executed by the CPU 702 to process the signal from a signal source 708. As such, the computer system 701 is a general-purpose computer system that becomes a specific purpose computer system when executing the routine 707 of the present invention.

The computer system 701 also includes an operating system and micro-instruction code. The various processes and functions described herein may either be part of the micro-instruction code or part of the application program (or a combination thereof) which is executed via the operating system. In addition, various other peripheral devices may be connected to the computer system 701 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
   receiving vertices of a mesh, wherein the mesh represents a volume of interest (VOI) from an original volume;
   performing a transformation operation on the mesh, wherein the transformation operation transforms vertices of the mesh, wherein the transformed vertices of the mesh can be anywhere in three-dimensional (3D) space so that a bounding box used in ray-layer buffer generation considers the transformed vertices;
   obtaining sampling locations of the original volume using the transformed vertices;
   performing an inverse transformation on the transformed vertices of the mesh and the sampling locations;
   rendering a cut-out of the VOI twice in each depth-peeling pass for creating a ray layer buffer, the first time as a static VOI and the second time as a floating VOI; and
   once the ray layer buffer is created, performing a ray casting on the original volume to produce an image, wherein the ray casting uses the transformed vertices and a result of the inverse transformation to define transformed starting positions of ray segments corresponding to regions inside the VOI.

2. The method of claim 1, wherein the transformation operation includes a translation, rotation, scaling, shearing, or mirroring.

3. The method of claim 1, further comprising:
   duplicating the vertices of the mesh to represent first and second VOIs of identical shapes;
   rendering the first VOI with a color lookup table full of zeros so that the first VOI represents an empty region;
   rendering the second VOI with the same color lookup table as a region outside the second VOI;

transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

4. The method of claim 1, further comprising:

duplicating the vertices of the mesh to represent first and second VOIs of identical shapes;

rendering the first VOI with a color lookup table different from voxels outside the first VOI;

rendering the second VOI with the same color lookup table as the first VOI;

transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

5. A system, comprising:

a memory device for storing a program;

a processor in communication with the memory device, the processor operative with the program to:

receive vertices of a mesh, wherein the mesh represents a volume of interest (VOI) from an original volume;

perform a transformation operation on the mesh, wherein the transformation operation transforms vertices of the mesh, wherein the transformed vertices of the mesh can be anywhere in three-dimensional (3D) space so that a bounding box used in ray-layer buffer generation considers the transformed vertices;

obtain sampling locations of the original volume using the transformed vertices;

perform an inverse transformation on the transformed vertices of the mesh and the sampling locations;

render a cut-out of the VOI twice in each depth-peeling pass for creating a ray layer buffer, the first time as a static VOI and the second time as a floating VOI; and once the ray layer buffer is created, perform a ray casting on the original volume to produce an image, wherein the ray casting uses the transformed vertices and a result of the inverse transformation to define transformed starting positions of ray segments corresponding to regions inside the VOI.

6. The system of claim 5, wherein the transformation operation includes a translation, rotation, scaling, shearing, or mirroring.

7. The system of claim 5, wherein the processor is further operative with the program to:

duplicate the vertices of the mesh to represent first and second VOIs of identical shapes;

render the first VOI with a color lookup table full of zeros so that the first VOI represents an empty region;

render the second VOI with the same color lookup table as a region outside the second VOI;

transform the mesh of the second VOI so that it moves away from an original position and orientation; and calculate sampling locations, which are used for rendering the second VOI, from the transformed mesh of the second VOI followed by an inverse transformation, so that these sampling locations are the same as those computed from an untransformed version of the mesh of the second VOI.

8. The system of claim 5, wherein the processor is further operative with the program to:

duplicate the vertices of the mesh to represent first and second VOIs of identical shapes;

render the first VOI with a color lookup table different from voxels outside the first VOI;

render the second VOI with the same color lookup table as the first VOI;

transform the mesh of the second VOI so that it moves away from an original position and orientation; and calculate sampling locations, which are used for rendering the second VOI, from the transformed mesh of the second VOI followed by an inverse transformation, so that these sampling locations are the same as those computed from an untransformed version of the mesh of the second VOI.

9. A computer program product, comprising:

a non-transitory computer readable storage medium having computer readable program code embodied therewith, the computer readable program code comprising:

computer readable program code configured to perform the steps of:

receiving vertices of a mesh, wherein the mesh represents a volume of interest (VOI) from an original volume;

performing a transformation operation on the mesh, wherein the transformation operation transforms vertices of the mesh, wherein the transformed vertices of the mesh can be anywhere in three-dimensional (3D) space so that a bounding box used in ray-layer buffer generation considers the transformed vertices;

obtaining sampling locations of the original volume using the transformed vertices;

performing an inverse transformation on the transformed vertices of the mesh and the sampling locations;

rendering a cut-out of the VOI twice in each depth-peeling pass for creating a ray layer buffer, the first time as a static VOI and the second time as a floating VOI; and once the ray layer buffer is created, performing a ray casting on the original volume to produce an image, wherein the ray casting uses the transformed vertices and a result of the inverse transformation to define transformed starting positions of ray segments corresponding to regions inside the VOI.

10. The computer program product of claim 9, wherein the transformation operation includes a translation, rotation, scaling, shearing, or mirroring.

11. The computer program product of claim 9, wherein the computer readable program code is further configured to perform the steps of:

duplicating the vertices of the mesh to represent first and second VOIs of identical shapes;

rendering the first VOI with a color lookup table full of zeros so that the first VOI represents an empty region;

rendering the second VOI with the same color lookup table as a region outside the second VOI;

transforming the mesh of the second VOI so that it moves away from an original position and orientation; and calculating sampling locations, which are used for rendering the second VOI, from the transformed mesh of the second VOI followed by an inverse transformation, so that these sampling locations are the same as those computed from an untransformed version of the mesh of the second VOI.

12. The computer program product of claim 9, wherein the computer readable program code is further configured to perform the steps of:

duplicating the vertices of the mesh to represent first and second VOIs of identical shapes;
rendering the first VOI with a color lookup table different from voxels outside the first VOI;
rendering the second VOI with the same color lookup table as the first VOI;
transforming the mesh of the second VOI so that it moves away from an original position and orientation; and
calculating sampling locations, which are used for rendering the second VOI, from the transformed mesh of the second VOI followed by an inverse transformation, so that these sampling locations are the same as those computed from an untransformed version of the mesh of the second VOI.

* * * * *